March 29, 1955 C. T. HALL 2,705,265
PARALLEL OPPOSED POWER AMPLIFIERS
Original Filed June 7, 1951
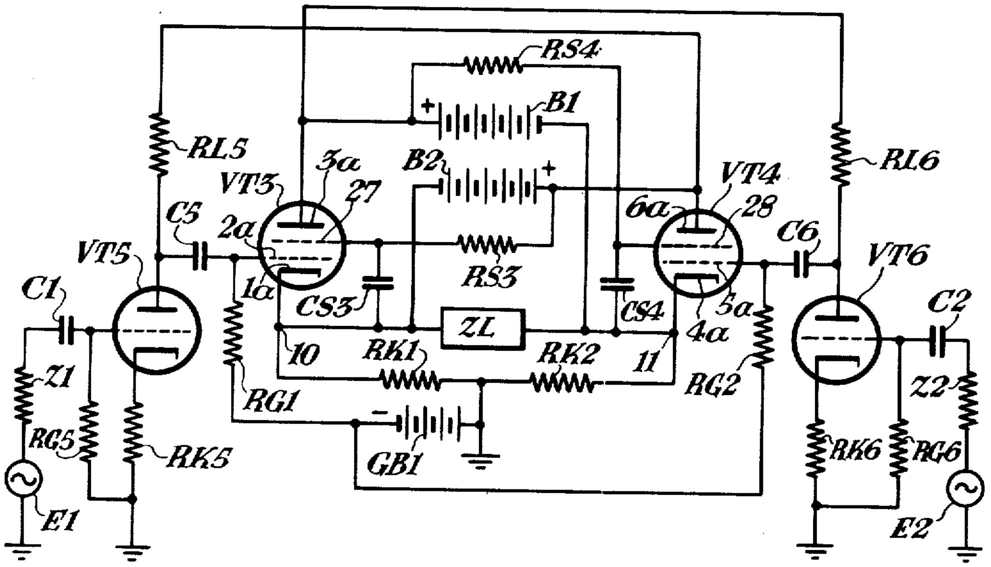
INVENTOR.
Cecil T. Hall.
BY
A. G. Williamson
HIS ATTORNEY 2,705,265
Patented Mar. 29, 1955

2,705,265

PARALLEL OPPOSED POWER AMPLIFIERS

Cecil T. Hall, Mount Lebanon, Pa.

Original application June 7, 1951, Serial No. 230,319. Divided and this application November 2, 1953, Serial No. 389,820

3 Claims. (Cl. 179—171)

My invention relates to an electronic power amplifier capable of supplying power in the lower portion of the frequency spectrum to a low impedance load, and more particularly to an electronic power amplifier capable of supplying essentially undistorted audio frequency power to a direct coupled low impedance load such as a loudspeaker, recording head, or the like.

The present application is a division of my copending application for Letters Patent of the United States, Serial No. 230,319, filed June 7, 1951, for Parallel Opposed Power Amplifier, now abandoned.

With a conventional amplifier, a coupling device or output transformer is employed to transfer the power supplied by the amplifier to the load. It is well known that various undesirable characteristics inherent in an output transformer seriously impair the ability of such an amplifier to supply undistorted audio frequency power to the load, a few of these undesirable characteristics being limited frequency response, and the power loss and phase shift which are variable depending upon the frequency. Accordingly, attempts have been made to improve the design of the coupling device or output transformer. However, these attempts have merely diminished the effect of these inherent undesirable characteristics, and have not resulted in their complete elimination.

Further characteristics with regard to an amplifier which supplies power to a load such as a loudspeaker, recording head, or the like, which should be taken into account are the characteristics of the load and the interaction between the load and the amplifier. From an examination of a typical curve showing the impedance of a conventional dynamic loudspeaker as a function of frequency, it is apparent that such a load has its lowest impedance at some frequency which usually is in the range from 400 to 1000 cycles per second, and that its impedance at other frequencies may be many times larger than its lowest impedance. Furthermore, the impedance at different frequencies may have a large inductive reactance component, or a large capacitive reactance component, or it may be essentially a resistance. Because the impedance characteristics of various loudspeakers are considerably different depending upon the size and design of the loudspeaker, it is common practice to determine the characteristics of an amplifier when it is supplying power to a resistive load of some particular value rather than when it is supplying power to a loudspeaker. With this procedure, any departure from expected results when the amplifier is supplying power to a loudspeaker is treated as a fault of the loudspeaker.

It follows, therefore, that to obtain the best results from an amplifier which supplies power to a load such as a dynamic loudspeaker or the like, the amplifier should be capable of responding to the various conditions imposed by the load. The customary manner of attempting to cause an amplifier to respond to the variations of the load is to employ feed-back circuits from the load to the amplifier. However, it is well known that when an amplifier is coupled to its load by means of an output transformer, the phase shift and time constants of the circuit limit the effectiveness and the magnitude of the feed-back that may be employed and also limit the correcting influence of the amplifier on the load or limit the damping that results from the use of feedback from the load to the amplifier.

It will be apparent, therefore, that it is desirable to eliminate the need for an output transformer in an amplifier which is intended to supply undistorted audio frequency power to loads such as loudspeakers, recording heads and the like.

With full output voltages appearing between the cathodes of the power amplifier tubes, which may be of large magnitude, particularly with high impedance loads or large power development with low impedance loads, it is necessary that the signal voltages to the control electrodes exceed these voltages. In practical applications with conventional driver tubes and power supply voltages such drive requirements are a limiting factor and in order to achieve maximum output and full efficiency of the power amplifier, means are needed to increase the signal voltages to the control electrodes of the power stage. Accordingly, it is an object of my invention to provide means of increasing the available signal voltage to the control electrodes of power balanced amplifiers having inherent degeneration at the cathode.

Another object of my invention is to provide an electronic power amplifier capable of supplying large amounts of power to low impedance loads in the frequency range extending from a fraction of a cycle to several million cycles per second.

Another object of my invention is to provide an electronic power amplifier which especially provides highly effective damping of low impedance loads when supplying power in the region of the low audio frequency range.

Another object of my invention is to provide an electronic power amplifier in which a relatively small voltage drop across a low impedance load results in relatively small variations in the anode voltage of the electron discharge devices, thereby permitting the amplifier to supply large peak output currents to the load.

Another object of my invention is to provide an electronic power amplifier in which no current flows through the associated load impedance in the absence of an input signal.

Another object of my invention is to provide an electronic power amplifier which is relatively inexpensive as compared to a conventional transformer type amplifier that is capable of supplying a comparable amount of undistorted peak power to a low impedance load.

Other objects of my invention as well as advantages and features of novelty thereof will be apparent from the following description taken in connection with the accompanying drawing.

Briefly described, my amplifier comprises a pair of electron discharge devices each having at least an anode, a cathode, and a control electrode, a pair of sources of direct current energy, a pair of voltage amplifier electron tubes to which regenerative feedback is applied, and a load. The positive terminal of the first source is connected to the anode of the first device, the cathode of the first device is connected to the negative terminal of the second source, the positive terminal of the second source is connected to the anode of the second device, and the cathode of the second device is connected to the negative terminal of the first source. A load is connected between like terminals of the two sources. The control electrodes of the two devices are supplied with oppositely phased signal voltages through the voltage amplifier tubes to each of which a regenerative feedback is applied.

I shall describe one form of an electronic power amplifier embodying my invention, and shall then point out the novel features thereof in claims.

The accompanying drawing is a diagrammatic view showing one form of an electronic power amplifier embodying my invention.

Referring to the drawing, there are provided a first electron discharge device or vacuum tube VT3 having at least an anode 3*a*, a cathode 1*a* and a control electrode or grid 2*a*; and a second electron discharge device or vacuum tube VT4 having at least an anode 6*a*, a cathode 4*a* and a control electrode or grid 5*a*. As shown in the drawing, the tubes VT3 and VT4 are tetrodes provided with screen grid electrodes 27 and 28, respectively. It is to be understood that my invention is not limited to tetrodes and triodes or tubes having additional grids can be used. Preferably, the tubes are of the type having relatively high transconductance. They also preferably have similar electrical characteristics.

Two sources of direct current energy having relatively small internal impedance are shown conventionally as batteries B1 and B2. These sources supply suitable anode voltage and current to tubes VT3 and VT4, and the magnitudes of the voltages supplied by batteries B1 and B2 are substantially the same. It is to be understood that sources of current other than batteries can be used.

It will be seen from the drawing that there is a series or ring circuit wherein the positive terminal of battery B1 is connected to the anode 3*a* of tube VT3, the cathode 1*a* of tube VT3 is connected to the negative terminal of battery B2, the positive terminal of battery B2 is connected to the anode 6*a* of tube VT4, and the cathode 4*a* of tube VT4 is connected to the negative terminal of battery B1.

If for the moment it is assumed that tubes VT3 and VT4 have effective internal impedances which are identical, it will be seen that a current flows through this ring circuit, and the flow of this ring circuit current may be traced from the positive terminal of battery B1, through the anode to cathode space of tube VT3, to the negative terminal of battery B2, from the positive terminal of battery B2, through the anode to cathode space of tube VT4, to the negative terminal of battery B1. Since as previously explained the magnitude of the voltages supplied by batteries B1 and B2 is substantially the same, and the effective internal impedances of tubes VT3 and VT4 are also the same, it will be apparent that the voltages appearing across the anode to cathode spaces of tubes VT3 and VT4, as a result of the flow of ring circuit current, will be equal. Since the voltages appearing across the anode to cathode spaces of the tubes are equal, each of these voltages will be equal to the voltage appearing across the terminals of each of the batteries, and furthermore, for each tube, the voltage at its cathode is negative with respect to its plate. Consequently, it will now be seen that there is no potential difference between the cathodes 1*a* and 4*a*, or points 10 and 11 in the ring circuit.

A low impedance load ZL which may be a loudspeaker, recording head or the like is here shown connected between points 10 and 11 in the ring circuit, and since there is no potential difference between points 10 and 11 at this time, no current will flow through the load impedance ZL. It should be noted that the load impedance ZL is connected in multiple, or shunt, with not only the effective internal impedance of tube VT3 and battery B1, but also the effective internal impedance of tube VT4 and battery B2. Furthermore, it is apparent from an inspection of the drawing that the load ZL can be connected across any two like voltage points of the two sources B1 and B2 and my invention contemplates the load ZL connected across any two points having the same voltage or polarity of the sources of direct current.

A bias battery GB1 is connected between the cathode 1*a* and the control electrode 2*a* of tube VT3 by means of a grid decoupling resistor RG1 and resistor RK1 to supply a negative bias voltage to the grid 2*a* with respect to the cathode 1*a*. Tube VT4 is similarly biased by means of bias battery GB1 connected between its cathode 4*a* and grid 5*a* by means of resistor RK2 and grid decoupling resistor RG2. Resistors RK1 and RK2 preferably have equal resistances each of which is several times larger than the impedance of the load ZL. Resistors RG1 and RG2 each preferably have a resistance that is selected in the usual manner depending upon the impedance of the sources of signal voltage and the input admittance of the tubes. The voltage of battery GB1 is proportioned so as to bias tubes VT3 and VT4 to provide approximately class A operation of each of the tubes as will be described hereinafter. There are a variety of well-known methods for providing biasing voltages for vacuum tubes, and it is to be understood that my invention is not limited to the method herein shown. Since the control electrodes 2*a* and 5*a* of the substantially identical tubes VT3 and VT4 are each identically biased by means of bias battery GB1, and the voltages appearing across their anode to cathode spaces are equal, the effective internal impedances of tubes VT3 and VT4 are the same.

When there is no current flowing through the load impedance ZL, the ring circuit can be considered as balanced.

In order to produce a voltage drop across the load impedance ZL and thereby supply power to the load, signal voltages are applied to the control electrodes of tubes VT3 and VT4, thereby disrupting the balanced condition previously described. A first source of signal voltage is conventionally illustrated as a voltage generator E1 and a series impedance Z1, and one of its terminals is connected by means of coupling capacitor C1 through an amplifier, to be described later, to the control electrode 2*a* of tube VT3, and the other is connected by means of a common ground connection and resistor RK1 to the cathode 1*a* of tube VT3. A second source of signal voltage, E2—Z2 is similarly connected between the control electrode 5*a* of tube VT4 and its cathode 4*a*. The signal voltages applied to the control electrodes 2*a* and 5*a* of tubes VT3 and VT4, respectively, are preferably of essentially equal magnitudes and oppositely phased or substantially 180° out of phase one with respect to the other. Methods of obtaining such signal voltages are well-known; examples being, by means of phase inverter circuits, or by means of properly phased transformer windings.

When the signal voltage applied to the control electrode 2*a* of tube VT3 increases in a positive direction, the effective internal impedance of tube VT3 decreases and the current flowing through the anode to cathode space of tube VT3 increases. At this time, the signal voltage applied to the control electrode 5*a* of tube VT4 will increase in a negative direction, thereby causing the effective internal impedance of tube VT4 to increase and the current flowing through the anode to cathode space of tube VT4 decreases. Obviously, since the current flowing through the anode to cathode space of tube VT4 decreases, that current, previously referred to as the ring current, correspondingly decreases, and a current which is the difference between the two currents which flow through the anode to cathode spaces of tubes VT3 and VT4 now flows through a circuit which may be traced from the positive terminal of battery B1 to the anode 3*a* of tube VT3, through the anode to cathode space of tube VT3 to the cathode 1*a*, from terminal 10 to 11 with the greater portion of the current flowing through the load impedance ZL and the remainder flowing through resistors RK1 and RK2 and from terminal 11 to the negative terminal of battery B1. It will be remembered that resistors RK1 and RK2 have resistances several times larger than the impedance of the load ZL, consequently, the current which flows through them is small as compared to the load current which flows through the load impedance ZL. Thus, for all practical purposes the load current can be considered as being the difference between the two currents which flow through the anode to cathode spaces of tubes VT3 and VT4.

Since at this time, the load current flows through the load impedance ZL from terminal 10 to 11, a voltage will appear across the terminals of the load impedance ZL, and the voltage measured at terminal 10 with respect to terminal 11 will be positive. Since resistors RK1 and RK2, connected in series across the terminals 10 and 11 and the load impedance, are of equal magnitude, and their junction is grounded, the voltage appearing at terminal 10 with respect to ground will be positive, and the voltage appearing at terminal 11 with respect to ground will be negative. Furthermore, the magnitude of each of the voltages will be equal to one-half of the voltage appearing across terminals 10 and 11 of the load impedance ZL. Since the half of the load voltage which appears at the cathode 1*a* of tube VT3 with respect to ground is positive, and since the signal voltage applied to the control electrode 2*a* of tube VT3 with respect to ground, is increasing in a positive direction, the effective signal voltage appearing between the control electrode 2*a* and the cathode 1*a* of tube VT3 is smaller than the magnitude of the signal voltage by the amount of half the load voltage. Also, with respect to tube VT4, since the voltage at its cathode 4*a* with respect to ground is negative and the signal voltage applied to its control electrode 5*a* with respect to ground is increasing in a negative direction, the effective signal voltage appearing between the control electrode 5*a* and cathode 4*a* of tube VT4 is smaller than the magnitude of the signal voltage by the amount of half the load voltage. This resulting condition of the effective signal voltage being less than the applied signal voltage by an amount proportional to the load voltage may be referred to as degenerative feedback and is an inherent characteristic of this circuit arrangement. It will be noted, however, that in this circuit arrangement only one-half of the voltage appearing across the terminals of the load impedance is effective in producing degenerative feedback in each of the tubes.

The effect of resistors RK1 and RK2 in the foregoing circuit arrangement is to provide a virtual center-tap for the load impedance ZL, as well as to provide a circuit between ground and the cathodes of the tubes for the biasing and signal voltages. However, if the load impedance ZL has a center-tap, the center-tap may be connected to ground and resistors RK1 and RK2 would not be required.

In view of the foregoing, and by the symmetry of this circuit arrangement it will readily be apparent that for the reverse condition, that is, when the signal voltage applied to the control electrode VT3 is increasing in a negative direction and the signal voltage applied to the control electrode 5*a* of tube VT4 is increasing in a positive direction, the conditions previously described with respect to tube VT3 will now occur with respect to tube VT4, the conditions previously described with respect to tube VT4 will now occur with respect to tube VT3, and the current flowing through the load impedance ZL will flow in the opposite direction, that is, from terminal 11 to terminal 10.

In order to maintain the screen grid electrode 27 of tube VT3 at a substantially constant positive direct current potential with respect to its cathode 1*a*, the screen grid 27 is connected to the positive terminal of battery B2 by means of resistor RS3, and a filter capacitor CS3 is connected between the screen grid 27 and the cathode 1*a*. The screen grid current of tube VT3 flows through a circuit which may be traced from the negative terminal of battery B2, through the cathode to screen grid space of tube VT3, and through resistor RS3 to the positive terminal of battery B2. Resistor RS3 is so proportioned that a suitable positive direct current potential appears across the cathode to screen grid space of tube VT3, and filter capacitor CS3 is so proportioned that momentary variations in the potential appearing across the cathode to screen grid space are eliminated. Similarly the screen grid 28 of tube VT4 is maintained at a substantially constant positive direct current potential with respect to its cathode 4*a* by means of battery B1, resistor RS4 and filter capacitor CS4. It is well known that beam power tetrodes may be operated with potentials of equal magnitudes applied to their anodes and screen grids with respect to their cathodes and accordingly resistors RS3 and RS4 could be replaced by direct connections and filter capacitors CS3 and CS4 would not be necessary.

As shown in the drawing, voltage amplifier tubes VT5 and VT6 together with regenerative feed-back circuits are provided so as to increase the signal voltages that would otherwise be supplied to the control grids 2*a* and 5*a* of tubes VT3 and VT4, respectively, from the signal sources E1 and E2. Tubes VT5 and VT6 are conventional voltage amplifier tubes arranged in voltage amplifying circuits employing the usual elements including cathode biasing resistors RK5 and RK6, grid leak resistors RG5 and RG6, coupling capacitors C5 and C6, and plate load resistors RL5 and RL6, respectively.

Whereas usual voltage amplifying circuits are supplied with a fixed or particular direct current voltage, these voltage amplifier circuits are supplied with direct current voltages which increase or decrease as the signal voltages available from them also increase or decrease, and thereby supply greater signal voltages than would otherwise be obtainable. That is, as was explained previously, when the signal voltage applied to the control electrode 2*a* of tube VT3 is increasing in a positive direction and the signal voltage applied to the control electrode 5*a* of tube VT4 is increasing in a negative direction, the voltage appearing at point 10 with respect to ground will be increasing in a positive direction, and the voltage appearing at point 11 with respect to ground will be increasing in a negative direction. Due to the usual 180° phase reversal of the signal voltage in voltage amplifier tubes it is obvious that the signal voltage applied to the control electrode of tube VT5 will be increasing in a negative direction and the signal voltage applied to the control electrode of tube VT6 will be increasing in a positive direction in order to supply the above signal voltages to tubes VT3 and VT4, respectively. However, the positive voltage supplied to the anode of tube VT5 by means of the feed-back circuit including resistor RL5 and battery B2 increases with respect to ground due to the voltage appearing at point 10 with respect to ground increasing in a positive direction, and the positive voltage supplied to the anode of tube VT6 by means of the feed-back circuit including resistor RL6 and battery B1 decreases with respect to ground due to the voltage appearing at point 11 with respect to ground increasing in a negative direction. Consequently, due to the increase or decrease in the voltages supplied to the anodes of tubes VT5 and VT6 at the same time the signal voltages supplied by these tubes to tubes VT3 and VT4 also increase or decrease, signal voltages of larger magnitude than would otherwise be obtainable are applied to the control electrodes of tubes VT3 and VT4.

In the foregoing description of the operation of the electronic power amplifier embodying my invention it was pointed out that the sources of direct current energy B1 and B2 supplied equal voltages to the power amplifier tubes, that the power amplifier tubes had similar electrical characteristics, and that in the absence of signal voltages there was no current flowing through the load impedance ZL, thus the ring circuit was considered as being balanced. However, in the use of my invention it will be appreciated that it is not essential that there be no current flowing through the load impedance ZL in the absence of signal voltages. That is, the ring circuit may be slightly unbalanced due to a slight difference in the voltages of sources B1 and B2, or differences in the impedances of the power amplifier tubes and thus in the absence of signal voltages there may be a relatively small current flowing through the load impedance ZL. It will be obvious that when signal voltages are applied to the power amplifier tubes, the load current will vary about a center value of current which is that relatively small resting current that results from the slight unbalance rather than vary about a zero current center when the ring circuit is balanced. Thus, in applications where a small resting current flowing through the load impedance in the absence of signal voltages is tolerable, circuit arrangements embodying my invention may readily be employed without taking great care to balance the circuit arrangements.

It was previously pointed out that the circuit arrangement embodying my invention is characterized by an inherent degenerative feed-back characteristic, but it should be noted that an unbalance in the circuit arrangements also results in an increased negative bias voltage being applied to the tube conducting the greater amount of current, and a decreased negative bias voltage being applied to the tube conducting the lesser current. This latter characteristic may be referred to as being inherent self-balancing in that it lessens the unbalance which would otherwise result were it not for this characteristic This self-balancing characteristic is a very important and desirable feature in that it lessens the amount of unbalance which may result from changes in the circuit components due to aging, differences in the power amplifier tubes due to the manufacturer's tolerances, and instability of a high transconductance power amplifier tube that manifests itself as a random change in the impedance of the tube.

In the circuit arrangement embodying my invention described above, a source of bias voltage, battery GB1, was employed to supply a particular negative bias voltage to the control electrodes of the power amplifier tubes. It is well known that some tubes do not require that their control electrodes be biased negatively with respect to their cathodes and accordingly the source of bias voltage could be replaced with a direct connection when such tubes are employed. Furthermore, it will be obvious that the source of bias voltage, battery GB1, could be arranged to supply two separately adjustable bias voltages with each connected to one or the other of the control electrodes of the two power amplifier tubes and thus each tube would be biased independently of the other tube. When such independent bias voltages are employed, the bias voltage applied to each of the two power amplifier tubes can independently be adjusted so as to balance a circuit arrangement which would otherwise be unbalanced due to dissimilarity of the circuit elements.

With the circuit arrangement embodying my invention shown and described above multistage inverse feedback may be employed in any of the conventional manners well known in the art. It should be noted that feedback voltage may be obtained from either the cathodes or the anodes of the power amplifier tubes regardless of where the load is connected, and also that push-pull feed-back voltages are available from either the two cathodes, or the two anodes of the power amplifier tubes.

In view of the fact that the cathodes and anodes of the power amplifier tubes as well as the sources of direct current energy connected therebetween are energized with signal output voltages, it may be stated that these elements float with respect to the signal output voltages.

In view of the foregoing, it will be apparent that an electronic power amplifier embodying my invention is capable of supplying large amounts of power to a relatively low impedance load in the frequency range extending from a fraction of a cycle to several million cycles per second. Furthermore, the usual coupling transformer between the load and the electron tubes may be eliminated, and large amounts of multistage inverse feedback may be employed so that essentially undistorted output voltages are supplied to a wide range of load impedances.

While this invention has been shown and described in a certain particular arrangement merely for the purpose of illustration, it will be understood that the general principles of this invention may be applied to other and widely varied organizations without departing from the spirit of the invention and the scope of the appended claims.

Having thus described my invention, what I claim is:

1. An electronic power amplifier comprising a first and a second electron discharge device each having an anode, a cathode, and a control electrode, a first and a second source of direct current energy each having a positive and a negative terminal; a circuit including the positive terminal of said first source connected to the anode of said first device, the cathode of said first device connected to the negative terminal of said second source, the positive terminal of said second source connected to the anode of said second device, and the cathode of said second device connected to the negative terminal of said first source; a load connected with the like terminals of said two sources, circuit means for supplying the control electrodes of said devices with oppositely phased signal voltages, and regenerative feed-back means comprising first circuit means connecting the anode of said first device to the control electrode of said second device, and second circuit means connecting the anode of said second device to the control electrode of said first device.

2. An electronic power amplifier comprising a first and a second electron discharge device each having an anode, a cathode, and a control electrode, a first and a second source of direct current energy each having a positive and a negative terminal; a circuit including the positive terminal of said first source connected to the anode of said first device, the cathode of said first device connected to the negative terminal of said second source, the positive terminal of said second source connected to the anode of said second device, and the cathode of said second device connected to the negative terminal of said first source; a load connected with the like terminals of said two sources, a pair of electronic amplifying means each having an input circuit and an output circuit, circuit means for supplying said input circuits of said amplifying means with oppositely phased signal voltages, circuit means connecting the output circuit of one of said amplifying means to the control electrode of said first device, circuit means connecting the output circuit of the other of said amplifying means to the control electrode of said second device, and regenerative feedback means comprising first circuit means connecting the anode of said first device to said output circuit of said other amplifying means, and second circuit means connecting the anode of said second device to said output circuit of said one amplifying means.

3. An electronic power amplifier comprising a first and a second electron discharge device each having an anode, a cathode, and a control electrode, a first and a second source of direct current energy each having a positive and a negative terminal; a circuit including the positive terminal of said first source connected to the anode of said first device, the cathode of said first device connected to the negative terminal of said second source, the positive terminal of said second source connected to the anode of said second device, and the cathode of said second device connected to the negative terminal of said first source; a load connected with the like terminals of said two sources, circuit means for supplying the control electrodes of said devices with oppositely phased signal voltages, a first regenerative feed-back circuit including a resistor connecting the anode of said first device to the control electrode of said second device, and a second regenerative feed-back circuit including a resistor connecting the anode of said second device to the control electrode of said first device.

References Cited in the file of this patent

UNITED STATES PATENTS

| | | |
|---|---|---|
| 2,201,345 | Percival | May 21, 1940 |
| 2,354,718 | Tuttle | Aug. 1, 1944 |
| 2,648,727 | Rockwell | Aug. 11, 1953 |